C. A. PFANSTIEHL.
TUNGSTEN REDUCING FURNACE.
APPLICATION FILED APR. 26, 1915.
1,289,896.
Patented Dec. 31, 1918.
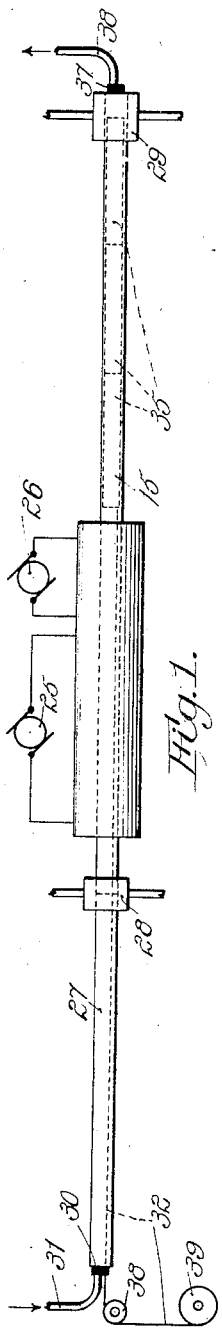
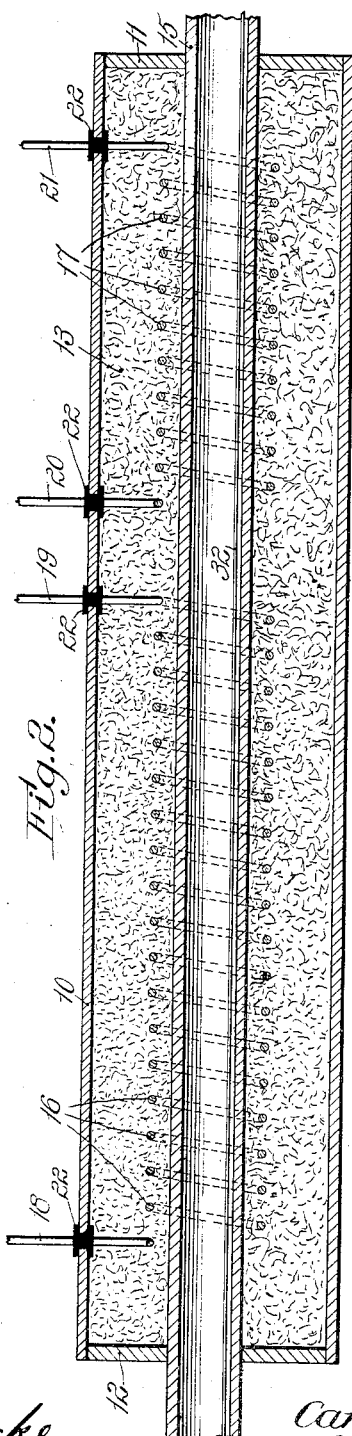
Witnesses:
Robert F. Bracke
Albin C. Ahlberg.
Inventor
Carl A. Pfanstiehl
By Williams & Bradbury
Attorneys

UNITED STATES PATENT OFFICE.

CARL A. PFANSTIEHL, OF WAUKEGAN, ILLINOIS, ASSIGNOR TO PFANSTIEHL COMPANY, INC., OF NORTH CHICAGO, ILLINOIS, A CORPORATION OF NEW YORK.

TUNGSTEN-REDUCING FURNACE.

1,289,896.　　　　　Specification of Letters Patent.　　Patented Dec. 31, 1918.

Application filed April 26, 1915. Serial No. 24,038.

*To all whom it may concern:*

Be it known that I, CARL A. PFANSTIEHL, a citizen of the United States, residing at Waukegan, in the county of Lake and State of Illinois, have invented certain new and useful Improvements in Tungsten-Reducing Furnaces, of which the following is a clear, concise, and exact description, reference being had to the accompanying drawings, forming a part of this specification.

My invention relates to tungsten reducing furnaces of the character adapted for use in reducing tungsten in large quantities for commercial purposes.

In the manufacture of malleable and ductile tungsten, which is becoming an article of great commercial importance in the electrical arts, I have found it to be of prime importance to secure very fine tungsten powder of a non-crystalline character in order that when compressed into ingots it can be made to absorb sufficient energy to aid in the fusion of the particles when the ingot is heated to weld the particles together. I have found that very fine tungsten powder may be secured by the reduction of very finely divided tungsten trioxid in a suitable reducing furnace. I have found also that too rapid heating of the tungsten trioxid, even in the presence of a large excess of hydrogen, causes crystallization of the reduced tungsten and causes the particles instead of being individually reduced to adhere to one another in the form of coarse and more or less crystalline powder. While it is possible to produce ductile tungsten from such coarse tungsten powder it must be treated in a manner much more expensive than the manner which I use in producing ductile tungsten from the very finely divided tungsten powder which may be produced by the apparatus herein described.

The apparatus of my present invention provides means for initially heating the tungsten trioxid in an atmosphere of hydrogen which is somewhat rapidly circulated over the tungsten trioxid in order to carry off the moisture formed by the union of the hydrogen and oxygen, the presence of water vapor also being detrimental to the formation of finely divided tungsten. It has been customary in the past to slowly heat the tungsten trioxid by bringing up the temperature of the reducing furnace very gradually, the tungsten trioxid remaining stationary within the furnace during the entire operation. At the end of the reducing operation the furnace must then be cooled down before a second charge of tungsten trioxid may be inserted. My present invention embraces an electrically heated furnace of the tubular type, having extensions therefrom at each end of the tube into one of which carriers or boats containing tungsten trioxid may be fed, and from the other of which these boats containing pure tungsten powder may be removed, means being provided for slowly drawing the boats of tungsten trioxid through the furnace so that the temperature of the tungsten trioxid is raised very gradually and the tungsten itself is cooled without the necessity of cooling down the reducing furnace between charges.

My invention is illustrated in the accompanying drawing in which,

Figure 1 illustrates the furnace with its charging and discharging tubes extending therefrom.

Fig. 2 is a section through the furnace with the charging and discharging tubes broken away.

Fig. 3 is a section through the plug at the left end of the tungsten discharge tube; and Fig. 4 is a perspective of the boats for carrying the tungsten trioxid through the furnace.

Like parts are represented by the same figures throughout all of the views.

The furnace proper comprises a main inclosing tube of metal 10, having circular metallic ends 11 and 12, which, when taken with the tube 10, form a box or retainer for the silica, or other refractory substance 13. Extending through this box and substantially four feet beyond the right end thereof is a metallic or silica tube 15 around which, within the box and embedded in the refractory material 13, are two resistance coils 16 and 17. These coils are somewhat larger than the tube 15 and are held by the refractory material so that they do not come into electrical connection with the tube 15. The coil 16 is provided with terminals 18 and 19, and the coil 17 with terminals 20 and 21 which are electrically separated from the tube 10 by insulating bushings 22. These coil terminals are connected with a suitable source of electricity, that for the coil 16 being diagrammatically illustrated as a generator 25, and that for coil 17 being diagrammatically illustrated as a generator 26.

The tube 15 extends only a slight distance beyond the end of the furnace box at which point it joins a second tube of similar diameter 27, the junction point being embraced by a cooling jacket 28 through which water or other cooling fluid is circulated. The right hand end of the tube 15, as above stated, extends about four feet beyond the furnace box and is also embraced at its end by a cooling jacket 29 through which cooling liquid is circulated. The left hand end of the tube 27 is provided with a snugly fitting plug 30 through which the hydrogen intake tube 31 is fitted, the plug 30 also being provided with an opening through which a nickel or tungsten wire 32 fits somewhat closely. The plug 30 is preferably of some soft material such as cork or rubber so that the opening through which the wire 30 passes will be substantially gas tight, though permitting the wire to be drawn through it.

The boats or carriers 35, shown in perspective in Fig. 4, are preferably made of pure nickel or tungsten, the left hand one of these being suitably attached to the wire 32 and the several boats being fastened together by means of the wire loops or links 36. The right hand opening into the tube 15 is closed by a removable plug 37 through which a hydrogen discharge tube 38 passes.

In the operation of this reducing mechanism the coil 16 is heated to a considerably higher temperature than the coil 17, so that the left hand end of the furnace is maintained at a high temperature while the right hand end thereof is maintained at a lower temperature. In order to charge the furnace before a reducing run the plugs 30 and 37 are removed and a train of boats 35 charged with tungsten trioxid, and having attached to it a wire 32 long enough to reach through the entire furnace is threaded in from the right hand end, the projecting end of the wire 32 being threaded through the opening in the stopper 30, passed over the pulley 38, and attached to the mechanically operated drawing pulley 39. The plugs 30 and 37 are then placed in the ends of the tubes 27 and 15 and the hydrogen supply is turned on and allowed to pass through the tube from left to right until all of the air has been driven out. The mechanically operated drawing mechanism 39 is then started and the boats containing the tungsten trioxid are slowly drawn through the furnace. Hydrogen gas is itself a good carrier of heat and since it is circulating from left to right it becomes heated as it passes through the heating coils 16 and 17 and gradually brings up the temperature of the boats or carriers and the tungsten trioxid contained therein. It requires from four to eight hours to complete the reduction of one charge of tungsten, but as soon as this charge has passed through the furnace and assumed its position in the tube 27, which is kept at a low temperature by the water jacket 28 and the presence of fresh cool hydrogen, the boats and their contents may be removed and others immediately inserted without waiting for the furnace to cool, and, in fact, without even interrupting the electric circuits through the heating coils.

My invention, therefore, provides means for producing very fine tungsten powder satisfactory for manufacturing malleable and ductile tungsten in less time than it has been heretofore possible to perform this operation and with practically no loss of time between the furnace charges. Although I have shown and described my invention with respect to details illustrated in the drawings, I do not wish to be unduly limited thereto, it being obvious that many modifications may be made without departing from the spirit or scope of my invention.

What I claim and wish to secure by Letters Patent is:

1. A reducing furnace for tungsten trioxid comprising a comparatively long and slender metallic tube, a pair of heating elements surrounding different portions of said tube, refractory material in which said heating elements are embedded, and means to independently control the current supplied to said heating elements so as to control the heating effects thereof and means to draw the tungsten trioxid from the zone of effect of one heating element into the zone of effect of the other.

2. A reducing furnace for tungsten trioxid comprising a tube, heating elements located near one end of said tube and adapted to heat the same, a cooling jacket for the extreme end of said tube, a second tube registering with the first within said cooling jacket, hydrogen injection means connected with the second tube, hydrogen exhaust means connected with the first tube, carriers, and means to draw said carriers through the heated portion of the first tube into the second tube.

3. In a reducing furnace, a long and slender tube, means for admitting reducing fluid at one end and discharging it at the other end of said tube, said tube comprising a charging chamber at the fluid ejection end heated by the hot fluid, a second chamber adjacent thereto, an electric heating element surrounding said second chamber, a third chamber adjacent thereto, a second and independent electric heating element surrounding said third chamber, a cooling element adjacent to the last named chamber, a cooling chamber at the fluid admission end of the tube and means for drawing the material to be reduced from the charging chamber to said last named chamber.

4. A reducing furnace for tungsten trioxid comprising a long and slender tube, one end of said tube forming a charging chamber into which tungsten trioxid to be reduced is admitted, the central portion of said tube having a chamber in which the tungsten trioxid is heated and reduced to metallic tungsten, a resistance element for heating the latter portion of said tube, and the other end of said tube having a cooling chamber for the metallic tungsten from which it is removed, a water jacket separating the heating and cooling chambers, and means for carrying the tungsten from the charging chamber through the reducing chamber and into the cooling chamber.

In witness whereof, I hereunto subscribe my name this 21st day of April, A. D. 1915.

CARL A. PFANSTIEHL.

Witnesses:
S. LEPKE,
J. W. LEODE.